(12) United States Patent
Miyata et al.

(10) Patent No.: US 7,095,575 B2
(45) Date of Patent: Aug. 22, 2006

(54) MAGNETIC DISK APPARATUS, METHOD FOR DETERMINING DATA TRACK PITCH, AND SELF-SERVO WRITE METHOD

(75) Inventors: Keizo Miyata, Kyoto (JP); Hiroshi Kohso, Osaka (JP); Makoto Kimura, Osaka (JP); Tatsuaki Ishida, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 36 days.

(21) Appl. No.: 10/931,971

(22) Filed: Sep. 2, 2004

(65) Prior Publication Data
US 2005/0052767 A1    Mar. 10, 2005

(30) Foreign Application Priority Data
Sep. 4, 2003    (JP)    ............. 2003-313049

(51) Int. Cl.
G11B 27/36    (2006.01)
(52) U.S. Cl. ............................ 360/31; 360/75
(58) Field of Classification Search .............. None
See application file for complete search history.

(56) References Cited

U.S. PATENT DOCUMENTS

| | | | |
|---|---|---|---|
| 5,581,420 A * | 12/1996 | Chainer et al. | ............... 360/75 |
| 5,867,337 A | 2/1999 | Shimomura | |
| 6,304,407 B1 | 10/2001 | Baker et al. | |
| 6,347,016 B1 | 2/2002 | Ishida et al. | |
| 6,445,521 B1 | 9/2002 | Schaff et al. | |
| 6,704,156 B1 | 3/2004 | Baker et al. | |
| 6,765,744 B1 * | 7/2004 | Gomez et al. | ............... 360/75 |
| 6,778,343 B1 * | 8/2004 | Nunnelley | ................... 360/31 |
| 2002/0105751 A1 | 8/2002 | Yasuna et al. | |

FOREIGN PATENT DOCUMENTS

| | | |
|---|---|---|
| JP | 8-225448 | 10/1996 |
| JP | 10-40544 | 2/1998 |
| JP | 2001-243733 | 9/2001 |
| JP | 2002-230929 | 8/2002 |

OTHER PUBLICATIONS

Jensen, Roy et al., "Demonstration of 500 Megabits Per Square Inch with Digital Magnetic Recording", IEEE Transactions of Magnetics, vol. 26, No. 5, 1990.

* cited by examiner

Primary Examiner—Andrea Wellington
Assistant Examiner—Dan I Davidson
(74) Attorney, Agent, or Firm—McDermott Will & Emery LLP

(57) ABSTRACT

A self-servo reference signal including a timing pattern and an oblique phase pattern is transferred in advance on a magnetic disk 1 by magnetic printing. A phase difference detection section 13 detects a phase difference between the two patterns to detect the position of a magnetic head 2. A burst signal generated by a record signal generation section 14 is recorded in a region of the magnetic disk 1 where no self-servo reference signal is recorded. A track pitch calculation section 11 determines a relationship between the reproduction output of the burst signal detected by a reproduction signal processing section 12 and the phase difference detected by the phase difference detection section 13, thus calculating an optimum data track pitch.

22 Claims, 8 Drawing Sheets

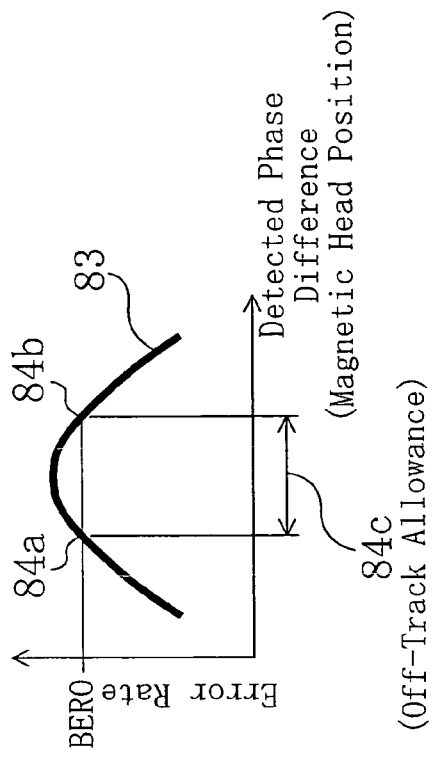
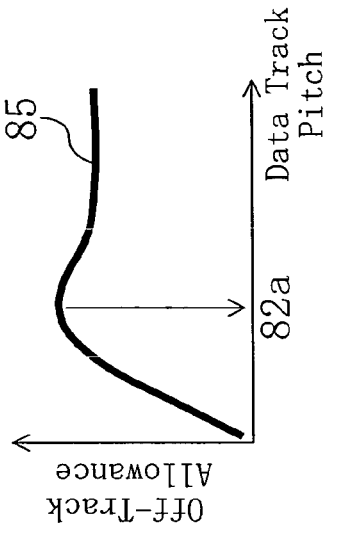
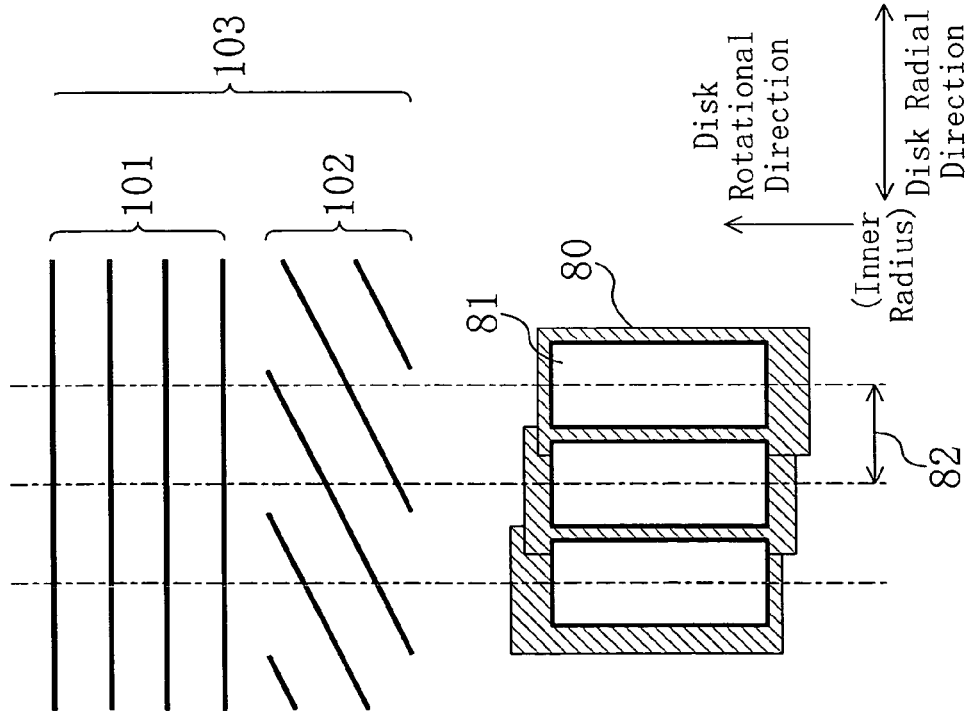
FIG. 5A
FIG. 5B
FIG. 5C

Disk Rotational Direction ↑

Disk Radial Direction ↔

MAGNETIC DISK APPARATUS, METHOD FOR DETERMINING DATA TRACK PITCH, AND SELF-SERVO WRITE METHOD

CROSS-REFERENCE TO RELATED APPLICATION

This application claims priority under 35 U.S.C. §119(a) on Japanese Patent Application No. 2003-313049 filed on Sep. 4, 2003, the entire contents of which are hereby incorporated by reference.

BACKGROUND OF THE INVENTION (1) Field of the Invention

The present invention relates to a magnetic disk apparatus, a method for determining a data track pitch, and a self-servo write method.

(2) Description of the Prior Art

In recent years, magnetic disk apparatuses have been rapidly reduced in size and increased in capacity. For example, as for an increase in the capacity of magnetic disk apparatuses, the track density of disks is increasing, and track pitch is being further reduced. Therefore, in order to accurately record/reproduce data on/from a magnetic disk, it is necessary to precisely position a magnetic head at a target track among the tracks formed at a small pitch.

The position of a magnetic head is detected by allowing the magnetic head itself to read out servo signals recorded in advance on a magnetic disk at a certain angular spacing. The positioning of the magnetic head is controlled based on the servo signals. Specifically, from the detected magnetic head position information, a position error signal indicating the position error of the magnetic head with respect to the target track is generated, and the positioning of the magnetic head is controlled such that the magnitude of the position error signal is minimized. Accordingly, in order to position the magnetic head with high precision, servo signals serving as the reference for the positioning of the magnetic head must be precisely recorded on the magnetic disk.

Generally, methods for recording servo signals on a magnetic disk include: (1) a method for using a dedicated servo track recording device; (2) a method for performing magnetic printing method; and (3) a self-servo write method. Hereinafter, these methods will be briefly described.

According to the method for using a servo track recording device, in recording servo signals, while a magnetic head of a magnetic disk apparatus is precisely positioned by an external actuator provided in the servo track recording device, the servo signals are sequentially recorded using the magnetic head. However, the servo track recording device is expensive. Further, in order to record servo signals for a single magnetic disk apparatus, a period of time in the range of several tens of minutes to about one hour is required. Therefore, the expensive servo track recording device is exclusively used for a long period of time, and servo signals cannot be recorded on the other magnetic disk apparatus during that time. Thus, it is pointed out that the method for using a servo track recording device presents problems in terms of productivity and cost. Furthermore, since the magnetic head is positioned by the external actuator, a clean environment is required in order to avoid intrusion of dust into the magnetic disk apparatus.

According to the method for performing a magnetic printing method, a master disk, on which a pattern corresponding to servo signals is formed, is prepared, and the transfer recording of the servo signals is performed on a magnetic disk at once using the master disk. As such a method, for example, the following method is proposed: a master disk, on which a ferromagnetic thin film pattern corresponding to servo signals is formed, is brought into intimate contact with a magnetic disk, and an external magnetic field is applied, thus performing the transfer recording of the servo signals on the magnetic disk at once (see, for example, Japanese Patent No. 3323743). According to this method, the need for a servo track recording device is eliminated, and servo signals can be recorded with high precision for an extremely short period of time.

According to the self-servo write method, a reference signal, which is used as the reference, is recorded in advance on a part of a recording surface of a magnetic disk. Then, servo signals are sequentially recorded at a predetermined head-traveling pitch, while a magnetic head controls the positioning thereof by reading out the reference signal and detecting the position thereof. Although the self-servo write method has the advantage that no servo track recording device is required, it is pointed out that there are problems in how to record the reference signal, used as the reference for the positioning of the magnetic head, on the magnetic disk with high precision and at low cost. Therefore, in order to solve such problems, a self-servo write technique for recording a reference signal by the above-described magnetic printing method is proposed (see, for example, Japanese Unexamined Patent Publication No. 2001-243733).

However, in any of these methods, although servo signals are sequentially recorded at a predetermined head-traveling pitch, the head-traveling pitch during the recording of the servo signals is determined based on a data track pitch. In order to realize a highly reliable magnetic disk that enables accurate recording/reproduction of data, an optimum or suitable (hereinafter, simply called "optimum") data track pitch has to be determined, and servo signals need to be recorded at a predetermined head-traveling pitch calculated based on the data track pitch. An optimum data track pitch is determined based on various characteristics such as the gap lengths and characteristics of a reproducing element and a recording element of a magnetic head, the magnetic property of a magnetic disk, and a spacing between the magnetic head and the magnetic disk. Normally, these characteristics are varied for each magnetic head and each magnetic disk. Hereinafter, a method for calculating an optimum data track pitch will be described.

FIG. 6 is a diagram for describing a common method for calculating a data track pitch. The reference number 2 denotes a magnetic head, the reference number 2a denotes a recording element of the magnetic head, and the reference number 2b denotes a reproducing element of the magnetic head. The reference number 2c denotes a deviation (offset amount) of each of the gap centers of the recording element 2a and the reproducing element 2b. It should be noted that the gap lengths of the recording element 2a and the reproducing element 2b are individually different. In calculating a data track pitch, first, a burst signal 20 with a constant frequency is recorded using the recording element 2a. Next, the burst signal 20 is reproduced using the reproducing element 2b.

If the position of the magnetic head 2 is minutely changed with respect to the position of the magnetic head 2 when the burst signal 20 is recorded, the reproduction output of the burst signal 20 is changed. The relationship between the position of the magnetic head 2 and the reproduction output, which is plotted, is called an "off-track profile", and is represented by a curve 21. For example, the position of the magnetic head 2 corresponding to a half of the maximum value of the reproduction output is located at positions 21a and 21b, and a distance 22 between these positions 21a and 21b can be set as an optimum data track pitch. Furthermore, by measuring the distance between the position of the magnetic head 2 when the burst signal 20 is recorded, and that of the magnetic head 2 when the reproduction output is maximized, an offset amount 2c can be calculated.

A method for calculating an optimum data track pitch is not limited to the above-described method. As another method for calculating an optimum data track pitch, the following method is known: the relationship between an off-track allowance and a data track pitch is determined with respect to data signals recorded on a plurality of tracks at a predetermined data track pitch, and the data track pitch at which the off-track allowance is maximized is set as an optimum data track pitch (see, for example, R. A. Jensen, J. Mortelmans and R. Hauswizer, "Demonstration of 500 Megabits per Square Inch with Digital Magnetic Recording", IEEE Trans. Magn., vol. 26, No. 5, pp2169–2171 (1990), and description around column 4, line 22 of USP 06445521). An off-track allowance will be described later.

FIGS. 7A through 7D are diagrams for describing the method. According to the present method, the following steps (1) through (4) are carried out.

(1) As background noise, pre-data signals 30 are recorded on a magnetic disk (see FIG. 7A).

(2) The pre-data signals 30 are overwritten with data signals 31 at a predetermined data track pitch 32 (see FIG. 7B).

(3) The position of a magnetic head (not shown) is minutely changed, and then an off-track characteristic 33 with respect to the error rate of reproduction signals of the data signals 31 is determined (see FIG. 7C). Further, magnetic head positions 34a and 34b when the error rate reaches a predetermined value (BER0) are determined, and a distance 34c between the positions 34a and 34b is determined. This is an off-track allowance.

(4) The data track pitch 32 is changed, and then the steps (2) and (3) are repeated, thus determining the relationship between the data track pitch and the off-track allowance (see FIG. 7D). A curve 35 representing the relationship between the data track pitch and the off-track allowance is generally called a "747 curve". Based on the 747 curve 35, a data track pitch 32a at which the off-track allowance is maximized is determined, and this data track pitch 32a is set as an optimum data track pitch.

As apparent from the measurement of the 747 curve, there is a close relationship between the data track pitch and the error rate of the reproduction signals, and the error rate of the reproduction signals varies depending on how the data track pitch is set. Therefore, in order to reduce read error in regard to the reproduction signals so that the reliability of a magnetic disk apparatus is improved, it is important to calculate an optimum data track pitch.

As a technique for determining a head-traveling pitch during recording of servo signals by using a self-servo write method, the following technique has already been proposed: a magnetic head is positioned using a reference signal recorded on a recording surface of a magnetic disk, and the above-mentioned off-track profile, for example, is determined to calculate an optimum head-traveling pitch. For example, in the proposed technique, the reference signal, which is used as the reference, is recorded in advance on a part of the recording surface of the magnetic disk, and the reference signal is read out by the magnetic head, thus determining the off-track profile (see, for example, Japanese Patent No. 3251804).

On the other hand, a technique for determining an off-track profile without using a reference signal is also proposed (see, for example, Japanese Unexamined Patent Publication No. 2002-230929). According to this technique, an actuator that supports a magnetic head is pressed against an elastic stopper provided in a magnetic disk apparatus, and an off-track profile is determined from the relationship between electric current for driving the actuator and reproduction output.

In the method for calculating an optimum data track pitch using an off-track profile and/or a 747 curve, for example, it is necessary to position a magnetic head with high precision and then to determine the reproduction output and/or error rate of signals.

In the method for recording servo signals using a dedicated servo track recording device, a magnetic head can be precisely positioned by using an external actuator. Since an off-track profile and/or a 747 curve are/is determined after the precise positioning of the magnetic head, the accurate calculation of an optimum data track pitch is theoretically possible. However, in recording servo signals, in addition to the step of recording servo signals themselves, the step of calculating a data track pitch is required. Therefore, a period of time during which the servo track recording device is exclusively used for a single magnetic disk apparatus is further extended, which might cause a further reduction in productivity. Accordingly, the fact is that at a site where magnetic disk apparatuses are mass-produced, an optimum data track pitch is not calculated for each magnetic disk apparatus, but a specific track pitch, determined averagely by considering variations in sizes and/or characteristics of recording and reproducing elements of the magnetic head, is uniformly set as an optimum data track pitch. Thus, if variations in various characteristics, such as the size and/or characteristic of each element of a magnetic head, the magnetic property of a magnetic disk, and a spacing between the magnetic head and the magnetic disk, are great, the resulting magnetic disk apparatus cannot achieve a desired performance, and the yield is reduced.

On the other hand, in the conventional technique for recording servo signals using a self-servo write method, it is difficult to say that the accuracy in calculating an optimum data track pitch is sufficiently high.

According to the technique disclosed in Japanese Patent No. 3251804, provisional servo information is recorded in advance on a part of a magnetic disk, and servo information is recorded using the provisional servo information. In order to calculate an optimum data track pitch with high accuracy, it is important to increase the accuracy of the provisional servo information that is recorded in advance. Therefore, in the technique disclosed in the above publication, the provisional servo information is recorded using a dedicated external device. However, since the dedicated external device is used, the advantage of the self-servo write method itself is reduced. Furthermore, since the provisional servo information is recorded only in a part of a recording region, the calculation of an optimum data track pitch is effective only for the recording region of the provisional servo information, and a data track pitch different from the optimum data track pitch is undesirably set for the other recording region.

According to the technique disclosed in Japanese Unexamined Patent Publication No. 2002-230929, a reference signal is not used, but an elastic stopper is utilized; however, in calculating a data track pitch, the deformation property of the elastic stopper becomes an error factor, and thus the data track pitch cannot be accurately calculated.

In a normal magnetic disk apparatus, a magnetic head is rotated around a rotation bearing (pivot) by a voice coil motor (VCM), and is moved from the outer radius of a magnetic disk to the inner radius of the magnetic disk (or from the inner radius to the outer radius). That is, the magnetic head can be moved substantially in a radial direction of the magnetic disk. However, since the magnetic head is rotated around the rotation bearing, the longitudinal direction of the head does not necessarily correspond to the radial direction of the magnetic disk, and a skew angle exists depending on the radial position of a recording track. FIGS. 8A and 8B are schematic diagrams illustrating the positional relationship among the recording element 2a, the reproducing element 2b and a recording track 41 in the case where no skew angle exists and in the case where a skew angle exists, respectively. As can be seen from FIGS. 8A and 8B, the projected length of the magnetic head in the radial direction, i.e., a substantial recording element width 2d, varies between the case where no skew angle exists (see FIG. 8A) and the case where a skew angle exists (see FIG. 8B). Besides, the substantial recording element width 2d also varies depending on the magnitude of the skew angle. Therefore, an optimum data track pitch 40 varies for each recording track position.

Thus, in a magnetic disk apparatus, an optimum data track pitch varies depending on the recording track position (radial position) of a magnetic disk. However, any of the above-described methods cannot cope with a variation in the optimum data track pitch due to the track position.

SUMMARY OF THE INVENTION

The present invention has been made in order to solve the above-described problems, and its object is to provide: a method for calculating an optimum data track pitch with high precision; a self-servo write method for recording, in a recording region of a magnetic disk, a servo signal at a head-traveling pitch determined based on the optimum data track pitch; and a highly reliable and low-cost magnetic disk apparatus that achieves an improved productivity by utilizing the data track pitch calculation method and/or the self-servo write method.

An inventive method for determining a data track pitch is a method for determining a data track pitch for a magnetic disk apparatus including: a magnetic disk; and a magnetic head for recording/reproducing information on/from the magnetic disk.

A self-servo reference signal is transferred on at least one recording surface of the magnetic disk by magnetic printing, the self-servo reference signal including a timing pattern formed in a predetermined direction and an oblique phase pattern formed in an oblique direction relative to the predetermined direction. The data track pitch determining method includes the steps of: (1) recording, at a predetermined position of the magnetic disk, a burst signal by the magnetic head while controlling the positioning of the magnetic head using the self-servo reference signal; (2) reproducing the burst signal by the magnetic head while minutely changing the position of the magnetic head from a position at which the burst signal is recorded, and detecting the position of the magnetic head in a radial direction of the magnetic disk by reproducing the self-servo reference signal, thus determining a relationship between the position of the magnetic head and the reproduction signal output of the burst signal; and (3) determining a data track pitch based on the relationship.

Another inventive method for determining a data track pitch includes the steps of: (1) provisionally setting a data track pitch to a predetermined pitch; (2) recording a predetermined data signal on a plurality of tracks by the magnetic head in accordance with the provisionally set data track pitch, while controlling the positioning of the magnetic head using the self-servo reference signal; (3) reproducing the data signal by the magnetic head while minutely changing the position of the magnetic head from a position at which the data signal is recorded, and detecting the position of the magnetic head in a radial direction of the magnetic disk by reproducing the self-servo reference signal, thus calculating an offset allowance from a relationship between the position of the magnetic head and the error rate of reproduction of the data signal; (4) changing the provisionally set data track pitch and then repeating the steps (1) through (3); and (5) determining a relationship between the provisionally set data track pitch and the offset allowance, and determining a data track pitch based on the relationship.

In one embodiment, a plurality of zones defined by radially dividing the magnetic disk may be set in advance for one or more recording surfaces of the magnetic disk, and a data track pitch may be determined for each of the zones.

In another embodiment, the data track pitch determining method may further include the step of transferring the self-servo reference signal on at least one recording surface of the magnetic disk by magnetic printing.

An inventive self-servo write method is a method for recording a servo signal using a magnetic disk apparatus including: a magnetic disk; and a magnetic head for recording/reproducing information on/from the magnetic disk, the servo signal being recorded on the magnetic disk by the magnetic head.

A self-servo reference signal is transferred on at least one recording surface of the magnetic disk by magnetic printing, the self-servo reference signal including a timing pattern formed in a predetermined direction and an oblique phase pattern formed in an oblique direction relative to the predetermined direction. The self-servo write method includes the steps of: (1) determining a data track pitch using the self-servo reference signal; (2) determining a head-traveling pitch based on the data track pitch; and (3) sequentially recording the servo signal on a plurality of tracks by the magnetic head in accordance with the head-traveling pitch, while controlling the positioning of the magnetic head using the self-servo reference signal.

In one embodiment, the step (1) may include the steps of: i) recording, at a predetermined position of the magnetic disk, a burst signal by the magnetic head, while controlling the positioning of the magnetic head using the self-servo reference signal; ii) reproducing the burst signal by the magnetic head while minutely changing the position of the magnetic head from a position at which the burst signal is recorded, and detecting the position of the magnetic head in a radial direction of the magnetic disk by reproducing the self-servo reference signal, thus determining a relationship between the position of the magnetic head and the reproduction signal output of the burst signal; and iii) determining a data track pitch based on the relationship.

Alternatively, the step (1) may include the steps of: a) provisionally setting a data track pitch to a predetermined pitch; b) recording a predetermined data signal on a plurality of tracks by the magnetic head in accordance with the provisionally set data track pitch, while controlling the positioning of the magnetic head using the self-servo reference signal; c) reproducing the data signal by the magnetic head while minutely changing the position of the magnetic head from a position at which the data signal is recorded, and detecting the position of the magnetic head in a radial direction of the magnetic disk by reproducing the self-servo reference signal, thus calculating an offset allowance from a relationship between the position of the magnetic head and the error rate of reproduction of the data signal; d) changing the provisionally set data track pitch and then repeating the steps a) through c); and e) determining a relationship between the provisionally set data track pitch and the offset allowance, and determining a data track pitch based on the relationship.

In another embodiment, it is preferable that: the magnetic disk apparatus further includes a memory; the magnetic head is formed by a recording/reproducing separate type magnetic head including a recording head and a reproducing head which are separate from each other; and the self-servo write method further includes the step iv) of calculating, from the relationship between the position of the magnetic head and the reproduction signal output of the burst signal, an offset amount between respective gap centers of the recording head and the reproducing head, and storing the calculated offset amount in the memory.

In still another embodiment, it is preferable that: a plurality of zones defined by radially dividing the magnetic disk are set in advance for one or more recording surfaces of the magnetic disk; and the step iv) is performed for each of the zones.

In still yet another embodiment, it is preferable that: a plurality of zones defined by radially dividing the magnetic disk are set in advance for one or more recording surfaces of the magnetic disk; and the step (1) is performed for each of the zones.

In another embodiment, the self-servo write method may further include the step of transferring the self-servo reference signal on at least one recording surface of the magnetic disk by magnetic printing.

An inventive disk apparatus includes: a magnetic disk; a magnetic head for recording/reproducing information on/from the magnetic disk; and data track pitch determining means for determining a data track pitch.

A self-servo reference signal is transferred on at least one recording surface of the magnetic disk by magnetic printing, the self-servo reference signal including a timing pattern formed in a predetermined direction and an oblique phase pattern formed in an oblique direction relative to the predetermined direction. The data track pitch determining means is formed to perform the steps of: (1) recording, at a predetermined position of the magnetic disk, a burst signal by the magnetic head while controlling the positioning of the magnetic head using the self-servo reference signal; (2) reproducing the burst signal by the magnetic head while minutely changing the position of the magnetic head from a position at which the burst signal is recorded, and detecting the position of the magnetic head in a radial direction of the magnetic disk by reproducing the self-servo reference signal, thus determining a relationship between the position of the magnetic head and the reproduction signal output of the burst signal; and (3) determining a data track pitch based on the relationship.

In another inventive disk apparatus, its data track pitch determining means is formed to perform the steps of: (1) provisionally setting a data track pitch to a predetermined pitch; (2) recording a predetermined data signal on a plurality of tracks by the magnetic head in accordance with the provisionally set data track pitch, while controlling the positioning of the magnetic head using the self-servo reference signal; (3) reproducing the data signal by the magnetic head while minutely changing the position of the magnetic head from a position at which the data signal is recorded, and detecting the position of the magnetic head in a radial direction of the magnetic disk by reproducing the self-servo reference signal, thus calculating an offset allowance from a relationship between the position of the magnetic head and the error rate of reproduction of the data signal; (4) changing the provisionally set data track pitch and then repeating the steps (1) through (3); and (5) determining a relationship between the provisionally set data track pitch and the offset allowance, and determining a data track pitch based on the relationship.

Still another inventive disk apparatus includes: a magnetic disk; a magnetic head for recording/reproducing information on/from the magnetic disk; and self-servo write means for recording a servo signal on the magnetic disk by the magnetic head.

A self-servo reference signal is transferred on at least one recording surface of the magnetic disk by magnetic printing, the self-servo reference signal including a timing pattern formed in a predetermined direction and an oblique phase pattern formed in an oblique direction relative to the predetermined direction. The self-servo write means includes: data track pitch determining means for determining a data track pitch utilizing the self-servo reference signal; means for determining a head-traveling pitch based on the data track pitch; and means for sequentially recording a servo signal on a plurality of tracks by the magnetic head in accordance with the head-traveling pitch, while controlling the positioning of the magnetic head using the self-servo reference signal.

In one embodiment, the data track pitch determining means may be formed to perform the steps of: (1) recording, at a predetermined position of the magnetic disk, a burst signal by the magnetic head while controlling the positioning of the magnetic head using the self-servo reference signal; (2) reproducing the burst signal by the magnetic head while minutely changing the position of the magnetic head from a position at which the burst signal is recorded, and detecting the position of the magnetic head in a radial direction of the magnetic disk by reproducing the self-servo reference signal, thus determining a relationship between the position of the magnetic head and the reproduction signal output of the burst signal; and (3) determining a data track pitch based on the relationship.

Alternatively, the data track pitch determining means may be formed to perform the steps of: (1) provisionally setting a data track pitch to a predetermined pitch; (2) recording a predetermined data signal on a plurality of tracks by the magnetic head in accordance with the provisionally set data track pitch, while controlling the positioning of the magnetic head using the self-servo reference signal; (3) reproducing the data signal by the magnetic head while minutely changing the position of the magnetic head from a position at which the data signal is recorded, and detecting the position of the magnetic head in a radial direction of the magnetic disk by reproducing the self-servo reference signal, thus calculating an offset allowance from a relationship between the position of the magnetic head and the error rate of reproduction of the data signal; (4) changing the provisionally set data track pitch and then repeating the steps (1) through (3); and (5) determining a relationship between the provisionally set data track pitch and the offset allowance, and determining a data track pitch based on the relationship.

In still another embodiment, it is preferable that: the magnetic head is formed by a recording/reproducing separate type magnetic head including a recording head and a reproducing head which are separate from each other; the data track pitch determining means is formed to calculate, from the relationship between the position of the magnetic head and the reproduction signal output of the burst signal, an offset amount between respective gap centers of the recording head and the reproducing head; and the apparatus further includes a memory for storing the offset amount.

In still yet another embodiment, it is preferable that: a plurality of zones defined by radially dividing the magnetic disk are set in advance for one or more recording surfaces of the magnetic disk; and the offset amount for each of the zones is stored in the memory.

In another embodiment, it is preferable that: a plurality of zones defined by radially dividing the magnetic disk are set in advance for one or more recording surfaces of the magnetic disk; and the data track pitch determining means determines a data track pitch for each of the zones.

According to the present invention, a self-servo reference signal is transferred in advance on a magnetic disk by magnetic printing. The self-servo reference signal includes a timing pattern and an oblique phase pattern, and these timing pattern and oblique phase pattern are reproduced by a magnetic head. By calculating a phase difference between the reproduction signals, it becomes possible to detect the position of the magnetic head with high precision. Therefore, it is possible to determine a data track pitch while controlling the positioning of the magnetic head with high precision utilizing the self-servo reference signal. As a result, a data track pitch can be determined with high precision.

Since the self-servo reference signal is transferred by magnetic printing, no dedicated servo track recording device is necessary. Therefore, the productivity of the magnetic disk apparatus is improved.

Recording of a servo signal is carried out while the positioning of the magnetic head is controlled with high precision utilizing the self-servo reference signal, and is performed in accordance with a head-traveling pitch calculated based on a precisely determined data track pitch. Thus, highly reliable recording of a servo signal is enabled.

Besides, since an optimum data track pitch can be calculated for each magnetic head, the tolerance for size variations of the magnetic head, for example, can be increased, and thus the productivity of the magnetic disk apparatus can be improved.

In the step of determining a data track pitch based on a relationship (off-track relationship) between the position of the magnetic head and the reproduction signal output of the burst signal, it is possible to know the position of the magnetic head when the burst signal is recorded, and the position at which an output when the burst signal is reproduced is maximized. Therefore, in addition to the calculation of an optimum data track pitch, it is possible to carry out the calculation of a distance, i.e., an offset amount, between respective gap centers of the recording head and the reproducing head.

The calculation of a data track pitch is carried out for each of a plurality of zones defined by radially dividing a recording region of the magnetic disk. Since the self-servo reference signal is transferred on the entire surface of the recording region of the magnetic disk by magnetic printing, the calculation of an optimum data track pitch is not limited to a part of the recording region of the magnetic disk, but can be carried out for the entire region. Therefore, it is possible to flexibly cope with a variation in the optimum data track pitch due to a change in skew angle, and to record a servo signal at the optimum data track pitch associated with each zone.

Consequently, the present invention can provide a highly reliable and low-cost magnetic disk apparatus.

BRIEF DESCRIPTION OF THE DRAWINGS

FIG. 5A is a schematic diagram showing a self-servo signal, pre-data signals and data signals.

FIG. 5B is a graph showing an off-track characteristic.

FIG. 5C is a graph showing a 747 curve.

DESCRIPTION OF THE PREFERRED EMBODIMENTS

Hereinafter, an embodiment of the present invention will be described in detail with reference to the accompanying drawings.

Figure 1:
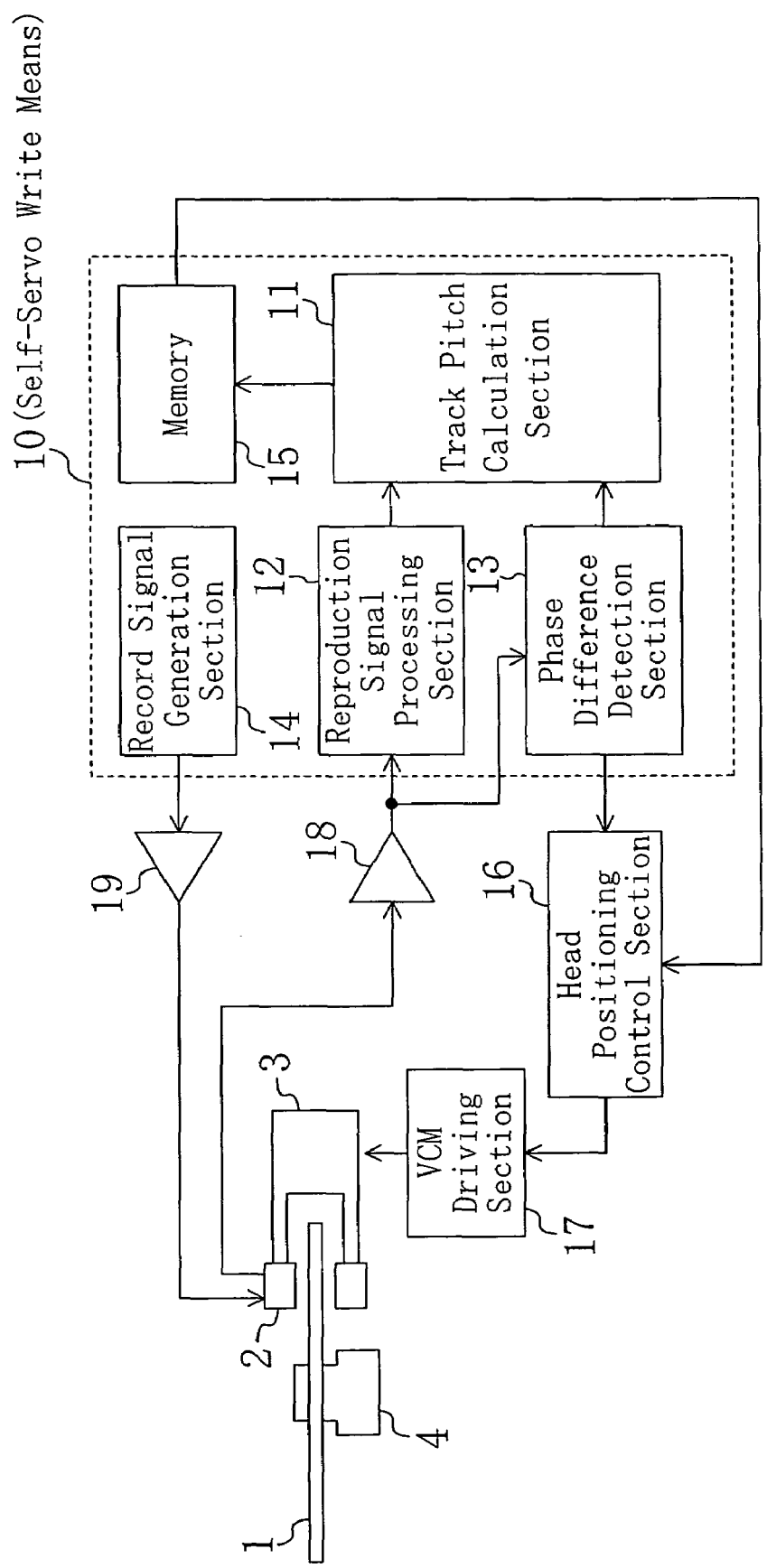
FIG. 1 is a block diagram illustrating the configuration of a principal part of a magnetic disk apparatus according to an embodiment of the present invention.

FIG. 1 is a block diagram illustrating the configuration of a principal part of a magnetic disk apparatus according to the embodiment of the present invention. The magnetic disk apparatus includes: a magnetic disk 1; a spindle motor 4 for rotating the magnetic disk 1; a magnetic head 2 for recording/reproducing information on/from the magnetic disk 1; and a voice coil motor (VCM) 3 for moving the magnetic head 2.

The magnetic head 2 has: an induction coil recording element 2a for recording information on the magnetic disk 1 (see FIG. 4); and a magnetoresistance effect reproducing element 2b for reading out information recorded on the magnetic disk 1 (see FIG.

4). The recording element 2a is connected with a recording amplifier 19, and the reproducing element 2b is connected with a reproducing amplifier 18. The magnetic head 2 can be moved from the outer radius of the magnetic disk 1 to the inner radius thereof, or from the inner radius to the outer radius by the voice coil motor (VCM) 3. That is, the magnetic head 2 can be moved substantially along a radial direction of the magnetic disk 1. A VCM driving section 17 receives a control signal from a head positioning control section 16, and applies a driving current to the VCM 3.

The magnetic disk apparatus further includes a self-servo write means 10. The self-servo write means 10 records, on the magnetic disk 1, servo signals used as the reference when the positioning of the magnetic head 2 is controlled, and includes: a track pitch calculation section 11; a reproduction signal processing section 12; a phase difference detection section 13; a record signal generation section 14; and a memory 15. The function of each section will be described in detail later.

Figure 2A:
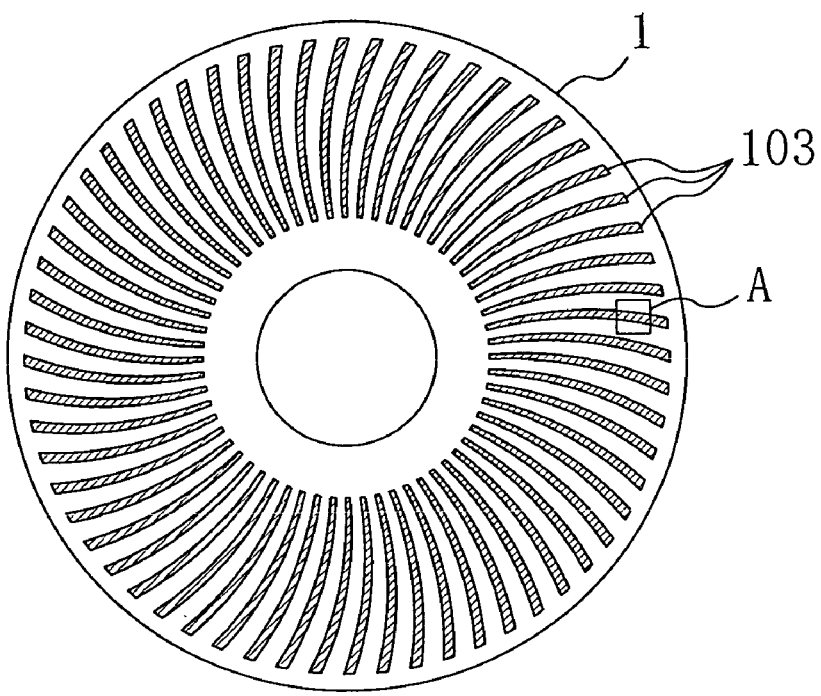
FIG. 2A is a plan view of a magnetic disk, showing self-servo reference signals.
Figure 2B:
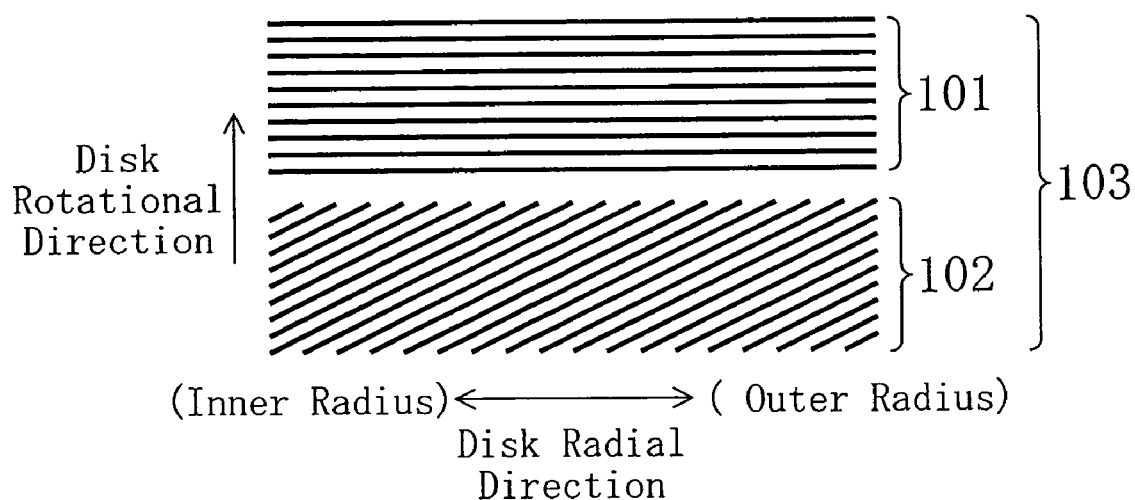
FIG. 2B is an enlarged view of an area A shown in FIG. 2A.

On the magnetic disk 1, reference signals (self-servo reference signals) for self-servo write are transferred in advance by magnetic printing. As a specific magnetic printing method, a known technique such as one disclosed in the above-mentioned Japanese Patent No. 3323743 can be utilized. That is, a master disk, on which a ferromagnetic thin film pattern corresponding to the self-servo reference signals is formed, is prepared, and is brought into intimate contact with the magnetic disk 1. And a direct-current external magnetic field is applied in a circumferential direction of the magnetic disk 1, thus making it possible to perform the transfer recording of the self-servo reference signals on the magnetic disk 1. FIGS. 2A and 2B are plan views for describing self-servo reference signals 103 recorded on the magnetic disk 1. As shown in FIG. 2A, the self-servo reference signals 103 are recorded over the entire surface of a recording region of the magnetic disk 1 at a certain angular spacing. FIG. 2B is an enlarged view of an area A shown in FIG. 2A. The self-servo reference signals 103 each include: a timing pattern 101 in which magnetization transitions are aligned in the radial direction of the magnetic disk 1; and an oblique phase pattern 102 in which magnetization transitions each have a certain angle with respect to the timing pattern 101. To be more specific, in the present embodiment, the oblique phase pattern 102 has an angle of about 20° with respect to the timing pattern 101. However, the angle of the oblique phase pattern 102 with respect to the timing pattern 101 is not limited to a particular angle.

The phase difference detection section 13 calculates a phase difference between a reproduction signal of the timing pattern 101 and a reproduction signal of the oblique phase pattern 102, and detects the position of the magnetic head 2 based on the phase difference. Hereinafter, a method for calculating a phase difference between a reproduction signal of the timing pattern 101 and a reproduction signal of the oblique phase pattern 102 will be described with reference to FIG. 3.

Figure 3:
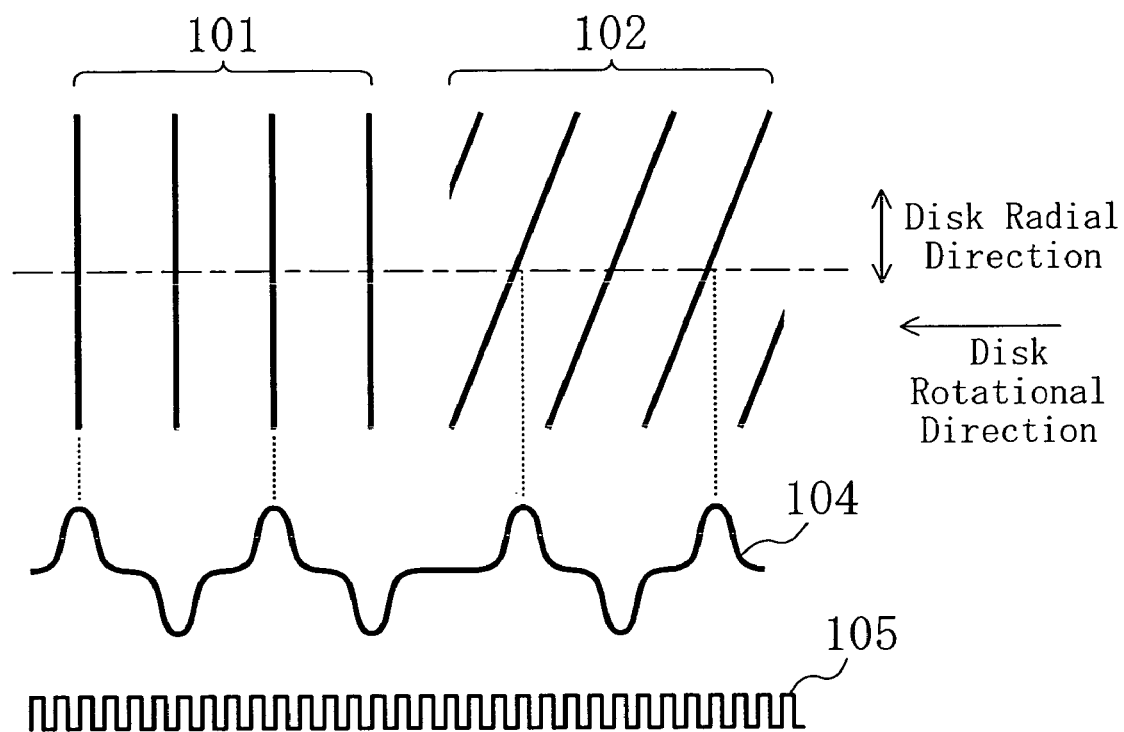
FIG. 3 is a schematic diagram for describing a method for detecting the position of a magnetic head using self-servo reference signals.

When the reproducing element 2b provided in the magnetic head 2 has reproduced the timing pattern 101 and the oblique phase pattern 102 along the alternate long and short dashed lines shown in FIG. 3, the reproduction signals thereof are represented as indicated by a waveform 104. A clock signal 105 is a signal generated by a PLL (phase locked loop) circuit from the reproduction signal of the timing pattern 101, and the phase of the clock signal 105 corresponds to that of the reproduction signal of the timing pattern 101. The frequency of the clock signal 105 is about 4 to 64 times as great as that of the reproduction signal of the timing pattern 101. In calculating the phase difference, in synchronization with this clock signal 105, the reproduction signal of the oblique phase pattern 102 is AD-converted. Then, the digital data obtained by the AD conversion is subjected to discrete Fourier transform (DFT) process, thus determining the phase difference between the oblique phase pattern 102 and the timing pattern 101.

This phase difference varies linearly with respect to the radial positional change of the magnetic head 2. Therefore, by calculating the phase difference, it becomes possible to accurately detect the radial position of the magnetic head 2. The calculated phase difference is inputted to the head positioning control section 16, and is utilized in controlling the positioning of the magnetic head 2. More specifically, the head positioning control section 16 outputs a head position control signal to the VCM driving section 17 based on the position of the magnetic head 2 determined utilizing the phase difference, thus positioning the magnetic head 2 at a predetermined position.

Before recording servo signals on the magnetic disk 1, it is necessary to calculate an optimum data track pitch. Hereinafter, a method for calculating an optimum data track pitch will be described.

Figure 4:
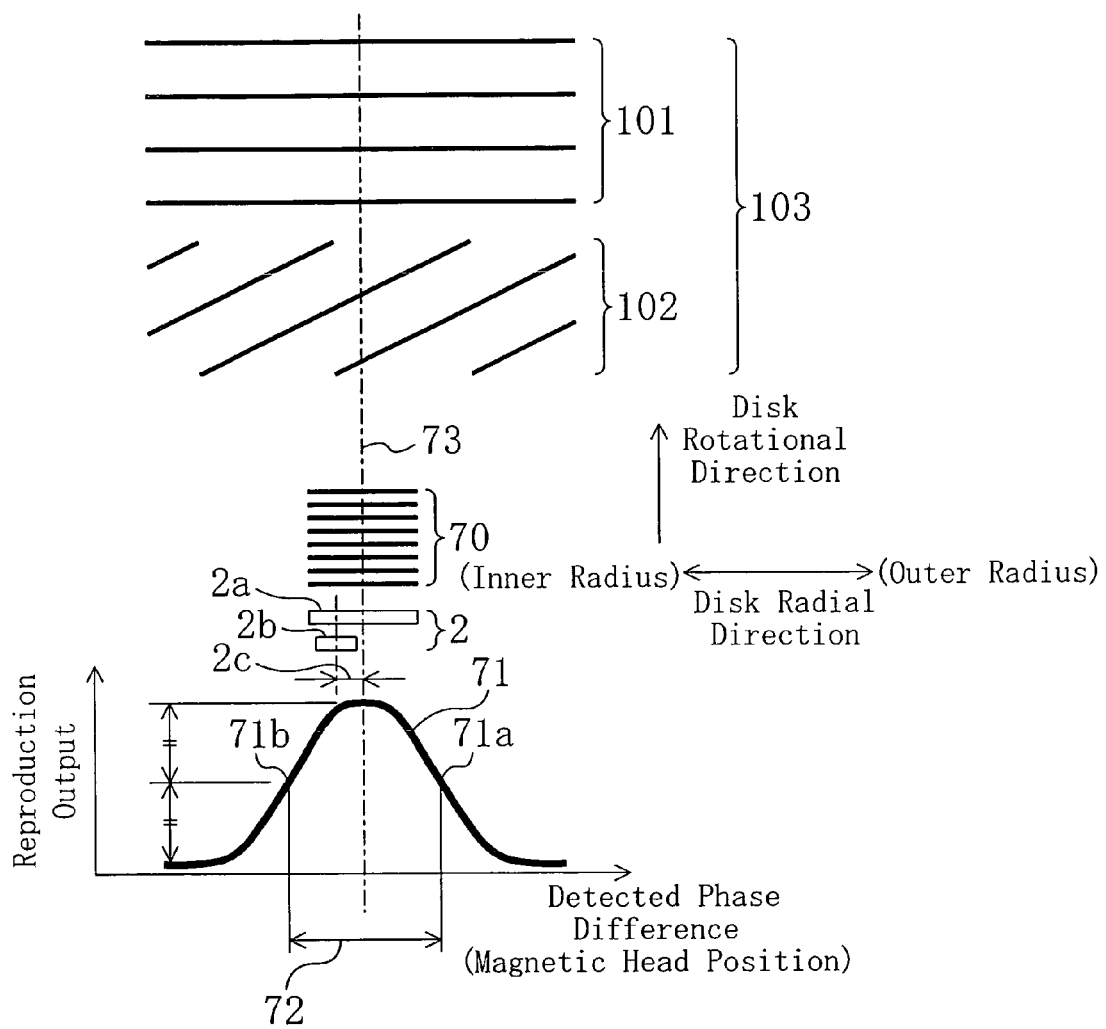
FIG. 4 is a schematic diagram for describing a method for determining an off-track profile and a method for calculating a data track pitch.
Figure 6:
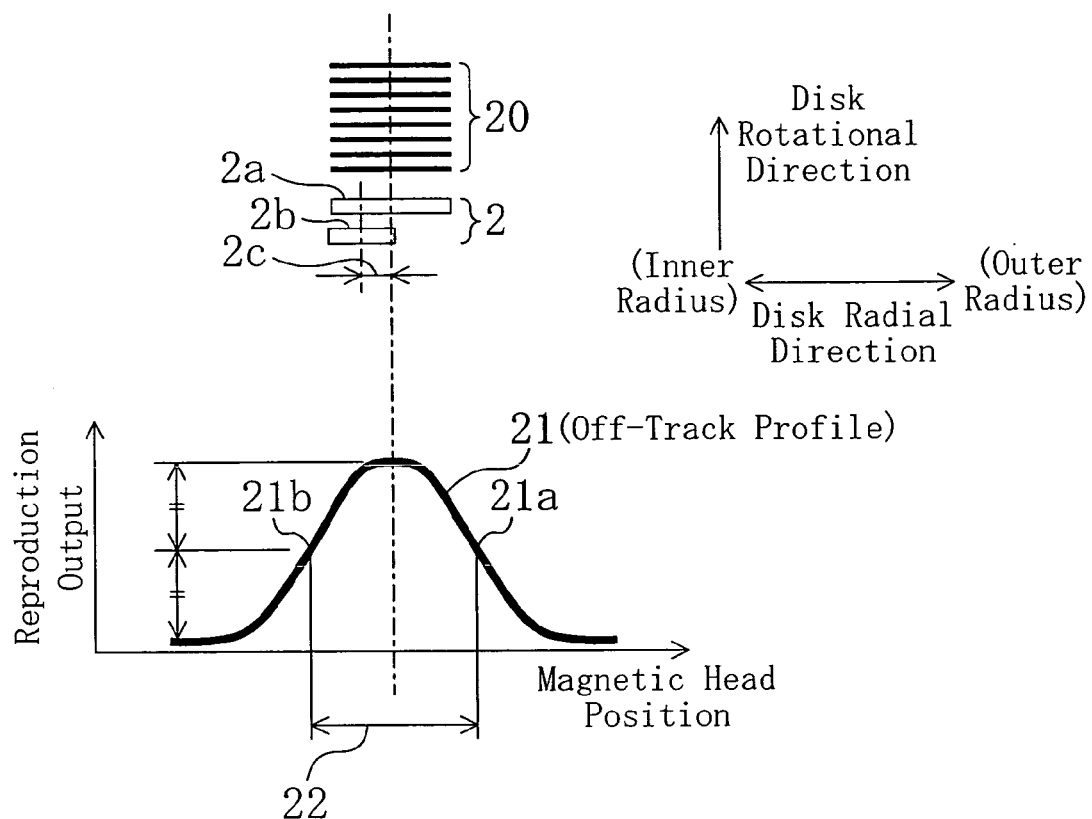
FIG. 6 is a schematic diagram for describing a common method for determining an off-track profile and a common method for calculating a data track pitch.
Figure 7A:
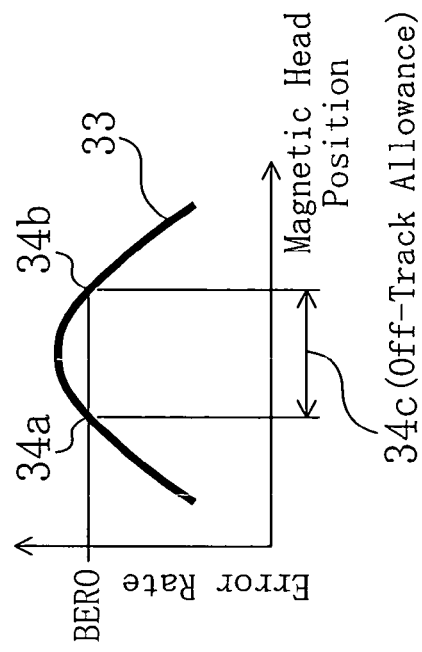
FIG. 7A is a schematic diagram showing pre-data signals.
Figure 7B:
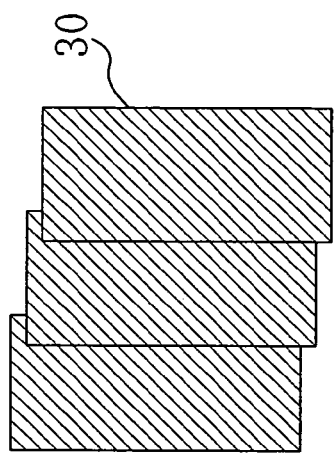
FIG. 7B is a schematic diagram showing data signals.
Figure 7C:
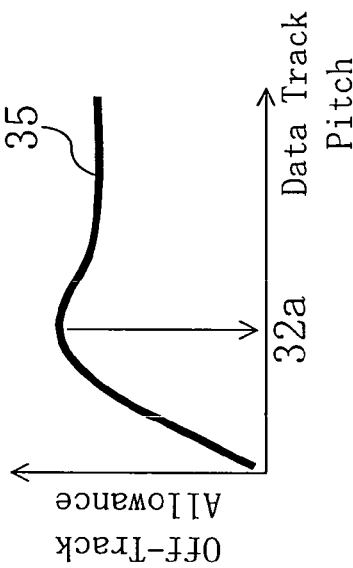
FIG. 7C is a graph showing an off-track characteristic.
Figure 7D:
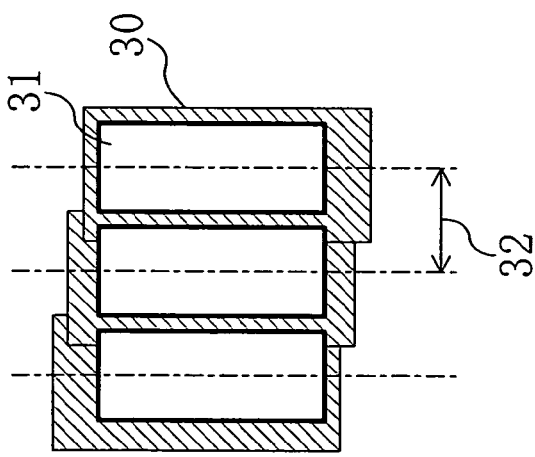
FIG. 7D is a graph showing a 747 curve.
Figure 8A:
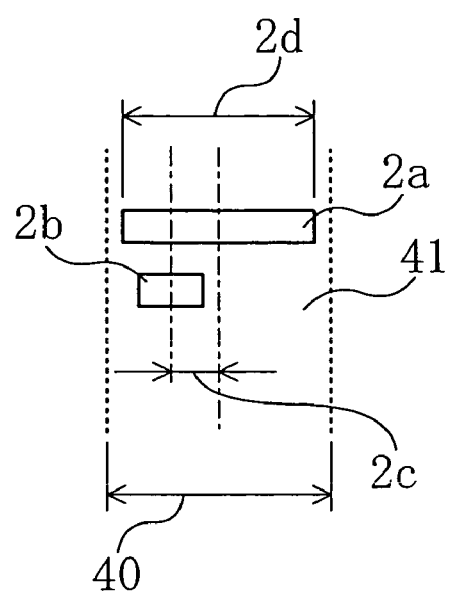
FIG. 8A is a plan view showing the positional relationship between a reproducing element and a recording element of a magnetic head in the case where no skew angle exists.
Figure 8B:
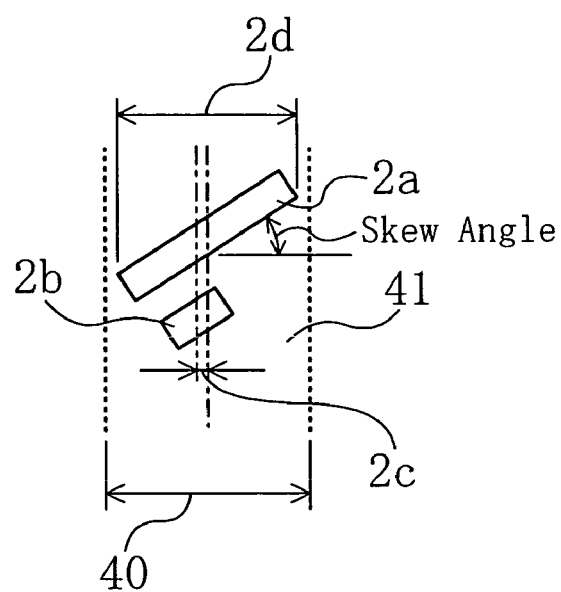
FIG. 8B is a plan view showing the positional relationship between a reproducing element and a recording element of a magnetic head in the case where a skew angle exists.

FIG. 4 is a diagram for describing a method for calculating an optimum data track pitch. First, the magnetic head 2 is positioned at a predetermined position over the magnetic disk 1 using the self-servo reference signal 103. Then, in this state, the record signal generation section 14 generates a signal with a constant frequency, and the magnetic head 2 records a burst signal 70 in a region of the magnetic disk 1 where no self-servo reference signal 103 is recorded. In FIG. 4, the position indicated by alternate long and short dashed lines 73 is the center position at which the burst signal 70 is recorded, and corresponds to the position of the recording element 2a of the magnetic head 2.

Next, the self-servo reference signal 103 is reproduced, and the position of the magnetic head 2 is detected by the phase difference detection section 13. Then, while the positioning of the magnetic head 2 is controlled, the position of the magnetic head 2 is minutely changed from the position 73 at which the burst signal 70 is recorded, and the reproduction output of the burst signal 70 is detected by the reproduction signal processing section 12. Thus, it becomes possible to obtain a relationship (off-track profile) 71 between the phase difference (position of the magnetic head 2) detected by the phase difference detection section 13 and the reproduction output of the burst signal 70 detected by the reproduction signal processing section 12.

The track pitch calculation section 11 calculates an optimum data track pitch based on this off-track profile 71. In the present embodiment, when the reproduction output becomes a half of its maximum value, the reproducing element 2b is located at positions 71a and 71b, and a distance 72 between these positions 71a and 71b is calculated as an optimum data track pitch. Further, in addition to the data track pitch, an offset amount is also calculated. The offset amount is calculated as a difference between the position of the magnetic head 2 when the burst signal 70 is recorded and the position of the magnetic head 2 when the reproduction output is maximized. In FIG. 4, the reference number 2c represents the offset amount.

The above-described calculation of the data track pitch and the offset amount is carried out for each plurality of zones defined by radially dividing the recording region of the magnetic disk 1, and the calculation results are stored in the memory 15. Specifically, in a 2.5-inch magnetic disk apparatus, for example, if the radius of the innermost recording track is 14 mm and that of the outermost recording track is 30 mm, eight zones are defined by dividing the recording region by 2 mm, and the data track pitch and offset amount are calculated for each zone and stored in the memory 15.

However, a method for calculating an optimum data track pitch is not limited to the above-described method. An optimum data track pitch may be determined based on various evaluation criteria, or by using various methods. As already described above, "optimum", as used herein, not only means optimum in the narrow sense but also means suitable.

FIGS. 5A through 5C are diagrams for describing another method for calculating a data track pitch. In the present method, an optimum data track pitch is calculated by carrying out the following steps (1) through (4).

(1) In the state where the positioning of the magnetic head 2 is controlled using the self-servo reference signal 103, suitable signals are generated by the record signal generation section 14, and pre-data signals 80 are recorded for a plurality of tracks by the magnetic head 2 in a region of the magnetic disk 1 where no self-servo reference signal 103 is recorded (see FIG. 5A). The track pitch when the pre-data signals 80 are recorded is set at a small value such that no gap is formed between recording tracks.

(2) Next, the track pitch is provisionally set to a predetermined pitch, predetermined data signals are generated by the record signal generation section 14, and the pre-data signals 80 are overwritten with data signals 81 at a provisionally set track pitch 82 (see FIG. 5A).

(3) Subsequently, the self-servo reference signal 103 is reproduced to detect the position of the magnetic head 2 by the phase difference detection section 13, thus controlling the positioning of the magnetic head 2. Then, with the positioning of the magnetic head 2 controlled, the data signals 81 are reproduced while the position of the magnetic head 2 is minutely changed from the position at which the data signals 81 are recorded, and an error rate is calculated by the reproduction signal processing section 12. Thus, the relationship (off-track characteristic) between the phase difference detected by the phase difference detection section 13 and the error rate detected by the reproduction signal processing section 12 is determined. It should be noted that the reference number 83 shown in FIG. 5B denotes a characteristic curve indicating an off-track characteristic. Thereafter, magnetic head positions 84a and 84b when the error rate becomes a predetermined error rate (BER0) are determined based on the off-track characteristic, and a distance 84c between these positions 84a and 84b is determined. This is defined as an off-track allowance. A value of about $1\times10^{-6}$, for example, may be set as the predetermined error rate BER0.

(4) Next, the track pitch 82 is changed, and then the steps (2) and (3) are repeated. Thus, as shown in FIG. 5C, it becomes possible to obtain a characteristic curve (747 curve) 85 indicating the relationship between the track pitch and the off-track allowance. Based on the 747 curve, the track pitch calculation section 11 calculates, as an optimum data track pitch 82a, the track pitch at which the off-track allowance is maximized. The calculation of an optimum data track pitch based on the 747 curve is carried out for each plurality of zones defined by radially dividing the recording region of the magnetic disk 1, and the optimum data track pitch for each zone is stored in the memory 15.

An exemplary method for calculating an optimum data track pitch has been described thus far. In the method for recording a servo signal according to the present embodiment, the head-traveling pitch is calculated based on the optimum data track pitch for each zone, and the servo signal is sequentially recorded for a predetermined number of tracks in accordance with the head-traveling pitch.

In recording the servo signal, the self-servo reference signal 103 is read out by the magnetic head 2, and the positioning of the magnetic head 2 is controlled. Then, the servo signal, generated by the record signal generation section 14, is recorded by the magnetic head 2 in a region of the magnetic disk 1 where no self-servo reference signal 103 is recorded.

After the servo signal has been recorded on the predetermined track in this manner, the servo signal is subsequently recorded on the other track. To be more specific, after the servo signal has been recorded at the predetermined track position, the head positioning control section 16 reads out, from the memory 15, the optimum data track pitch for each zone, and the magnetic head 2 is moved by the head-traveling pitch calculated based on the optimum data track pitch. Then, the servo signal is recorded at the track position subsequent to the movement. Thereafter, by repeating this step, the servo signal is recorded in the entire recording region of the magnetic disk 1.

As described above, in the present embodiment, the optimum data track pitch and the offset amount of the magnetic head 2 are calculated utilizing the self-servo reference signal 103 transferred in advance on the magnetic disk 1 by magnetic printing. Thereafter, the magnetic head 2 is precisely positioned using the self-servo reference signal 103, and the servo signal is recorded in accordance with the head-traveling pitch calculated based on the optimum data track pitch. The self-servo reference signal 103 is transferred by using a magnetic printing technique, and thus an expensive device used exclusively for recording is not required. Furthermore, since the optimum data track pitch is calculated for each magnetic head 2, the tolerance for size variations of the magnetic head 2 can be increased, and even the magnetic head 2 that is normally out of spec can be used. As a result, the productivity of the magnetic disk apparatus is improved to provide the low-cost magnetic disk apparatus.

Besides, since the magnetic head 2 can be precisely positioned by detecting the phase difference of the oblique phase pattern 102 included in the self-servo reference signal 103, it is possible to determine, with high precision, the off-track profile and/or 747 curve required in calculating an optimum data track pitch. Accordingly, the accuracy in calculating an optimum data track pitch can be increased. Although an optimum data track pitch generally varies due to a change in skew angle, the present embodiment achieves the effect of coping with the variation in the optimum data track pitch with respect to the skew angle because the optimum data track pitch is calculated for each zone defined by radially dividing the recording region of the magnetic disk. Consequently, a highly reliable magnetic disk apparatus can be provided.

What is claimed is:

1. A method for determining a data track pitch for a magnetic disk apparatus comprising: a magnetic disk; and a magnetic head for recording/reproducing information on/from the magnetic disk,
   wherein a self-servo reference signal is transferred on at least one recording surface of the magnetic disk by magnetic printing, the self-servo reference signal comprising a timing pattern formed in a predetermined direction and an oblique phase pattern formed in an oblique direction relative to the predetermined direction, and
   wherein the method comprises the steps of:
   (1) recording, at a predetermined position of the magnetic disk, a burst signal by the magnetic head while controlling the positioning of the magnetic head using the self-servo reference signal;

(2) reproducing the burst signal by the magnetic head while minutely changing the position of the magnetic head from a position at which the burst signal is recorded, and detecting the position of the magnetic head in a radial direction of the magnetic disk by reproducing the self-servo reference signal, thus determining a relationship between the position of the magnetic head and the reproduction signal output of the burst signal; and (3) determining a data track pitch based on the relationship.

2. A method for determining a data track pitch for a magnetic disk apparatus comprising: a magnetic disk; and a magnetic head for recording/reproducing information on/from the magnetic disk, wherein a self-servo reference signal is transferred on at least one recording surface of the magnetic disk by magnetic printing, the self-servo reference signal comprising a timing pattern formed in a predetermined direction and an oblique phase pattern formed in an oblique direction relative to the predetermined direction, and wherein the method comprises the steps of:

(1) provisionally setting a data track pitch to a predetermined pitch;

(2) recording a predetermined data signal on a plurality of tracks by the magnetic head in accordance with the provisionally set data track pitch, while controlling the positioning of the magnetic head using the self-servo reference signal;

(3) reproducing the data signal by the magnetic head while minutely changing the position of the magnetic head from a position at which the data signal is recorded, and detecting the position of the magnetic head in a radial direction of the magnetic disk by reproducing the self-servo reference signal, thus calculating an offset allowance from a relationship between the position of the magnetic head and the error rate of reproduction of the data signal;

(4) changing the provisionally set data track pitch and then repeating the steps (1) through (3); and (5) determining a relationship between the provisionally set data track pitch and the offset allowance, and determining a data track pitch based on the relationship.

3. The method according to claim 1, wherein a plurality of zones defined by radially dividing the magnetic disk are set in advance for one or more recording surfaces of the magnetic disk, and the data track pitch is determined for each of the zones.

4. The method according to claim 1, wherein the method further comprises the step of transferring the self-servo reference signal on at least one recording surface of the magnetic disk by magnetic printing.

5. A self-servo write method for recording a servo signal using a magnetic disk apparatus comprising: a magnetic disk; and a magnetic head for recording/reproducing information on/from the magnetic disk, the servo signal being recorded on the magnetic disk by the magnetic head, wherein a self-servo reference signal is transferred on an entire surface of at least one recording surface of the magnetic disk by magnetic printing, the self-servo reference signal comprising a timing pattern formed in a predetermined direction and an oblique phase pattern formed in an oblique direction relative to the predetermined direction, and wherein the method comprises the steps of:

(1) determining a data track pitch using the self-servo reference signal;

(2) determining a head-traveling pitch based on the data track pitch; and (3) sequentially recording the servo signal on a plurality of tracks by the magnetic head in accordance with the head-traveling pitch, while controlling the positioning of the magnetic head using the self-servo reference signal.

6. The method according to claim 5, wherein the step (1) comprises the steps of:

i) recording, at a predetermined position of the magnetic disk, a burst signal by the magnetic head, while controlling the positioning of the magnetic head using the self-servo reference signal;

ii) reproducing the burst signal by the magnetic head while minutely changing the position of the magnetic head from a position at which the burst signal is recorded, and detecting the position of the magnetic head in a radial direction of the magnetic disk by reproducing the self-servo reference signal, thus determining a relationship between the position of the magnetic head and the reproduction signal output of the burst signal; and iii) determining a data track pitch based on the relationship.

7. The method according to claim 5, wherein the step (1) comprises the steps of:

a) provisionally setting a data track pitch to a predetermined pitch;

b) recording a predetermined data signal on a plurality of tracks by the magnetic head in accordance with the provisionally set data track pitch, while controlling the positioning of the magnetic head using the self-servo reference signal;

c) reproducing the data signal by the magnetic head while minutely changing the position of the magnetic head from a position at which the data signal is recorded, and detecting the position of the magnetic head in a radial direction of the magnetic disk by reproducing the self-servo reference signal, thus calculating an offset allowance from a relationship between the position of the magnetic head and the error rate of reproduction of the data signal;

d) changing the provisionally set data track pitch and then repeating the steps a) through c); and e) determining a relationship between the provisionally set data track pitch and the offset allowance, and determining a data track pitch based on the relationship.

8. The method according to claim 6, wherein the magnetic disk apparatus further comprises a memory, wherein the magnetic head is formed by a recording/reproducing separate type magnetic head comprising a recording head and a reproducing head which are separate from each other, and wherein the method further comprises the step iv) of calculating, from the relationship between the position of the magnetic head and the reproduction signal output of the burst signal, an offset amount between respective gap centers of the recording head and the reproducing head, and storing the calculated offset amount in the memory.

9. The method according to claim 8,
wherein a plurality of zones defined by radially dividing the magnetic disk are set in advance for one or more recording surfaces of the magnetic disk, and the step iv) is performed for each of the zones.

10. The method according to claim 5,
wherein a plurality of zones defined by radially dividing the magnetic disk are set in advance for one or more recording surfaces of the magnetic disk, and the step (1) is performed for each of the zones.

11. The method according to claim 5,
wherein the method further comprises the step of transferring the self-servo reference signal on at least one recording surface of the magnetic disk by magnetic printing.

12. A magnetic disk apparatus comprising: a magnetic disk; a magnetic head for recording/reproducing information on/from the magnetic disk; and data track pitch determining means for determining a data track pitch,
wherein a self-servo reference signal is transferred on at least one recording surface of the magnetic disk by magnetic printing, the self-servo reference signal comprising a timing pattern formed in a predetermined direction and an oblique phase pattern formed in an oblique direction relative to the predetermined direction, and
wherein the data track pitch determining means is formed to perform the steps of:
(1) recording, at a predetermined position of the magnetic disk, a burst signal by the magnetic head while controlling the positioning of the magnetic head using the self-servo reference signal;
(2) reproducing the burst signal by the magnetic head while minutely changing the position of the magnetic head from a position at which the burst signal is recorded, and detecting the position of the magnetic head in a radial direction of the magnetic disk by reproducing the self-servo reference signal, thus determining a relationship between the position of the magnetic head and the reproduction signal output of the burst signal; and
(3) determining a data track pitch based on the relationship.

13. A magnetic disk apparatus comprising: a magnetic disk; a magnetic head for recording/reproducing information on/from the magnetic disk; and data track pitch determining means for determining a data track pitch,
wherein a self-servo reference signal is transferred on at least one recording surface of the magnetic disk by magnetic printing, the self-servo reference signal comprising a timing pattern formed in a predetermined direction and an oblique phase pattern formed in an oblique direction relative to the predetermined direction, and
wherein the data track pitch determining means is formed to perform the steps of:
(1) provisionally setting a data track pitch to a predetermined pitch;
(2) recording a predetermined data signal on a plurality of tracks by the magnetic head in accordance with the provisionally set data track pitch, while controlling the positioning of the magnetic head using the self-servo reference signal;
(3) reproducing the data signal by the magnetic head while minutely changing the position of the magnetic head from a position at which the data signal is recorded, and detecting the position of the magnetic head in a radial direction of the magnetic disk by reproducing the self-servo reference signal, thus calculating an offset allowance from a relationship between the position of the magnetic head and the error rate of reproduction of the data signal;
(4) changing the provisionally set data track pitch and then repeating the steps (1) through (3); and
(5) determining a relationship between the provisionally set data track pitch and the offset allowance, and determining a data track pitch based on the relationship.

14. A magnetic disk apparatus comprising: a magnetic disk; a magnetic head for recording/reproducing information on/from the magnetic disk; and self-servo write means for recording a servo signal on the magnetic disk by the magnetic head,
wherein a self-servo reference signal is transferred on an entire surface of at least one recording surface of the magnetic disk by magnetic printing, the self-servo reference signal comprising a timing pattern formed in a predetermined direction and an oblique phase pattern formed in an oblique direction relative to the predetermined direction, and
wherein the self-servo write means comprises:
data track pitch determining means for determining a data track pitch utilizing the self-servo reference signal;
means for determining a head-traveling pitch based on the data track pitch; and
means for sequentially recording a servo signal on a plurality of tracks by the magnetic head in accordance with the head-traveling pitch, while controlling the positioning of the magnetic head using the self-servo reference signal.

15. The apparatus according to claim 14,
wherein the data track pitch determining means is formed to perform the steps of:
(1) recording, at a predetermined position of the magnetic disk, a burst signal by the magnetic head while controlling the positioning of the magnetic head using the self-servo reference signal;
(2) reproducing the burst signal by the magnetic head while minutely changing the position of the magnetic head from a position at which the burst signal is recorded, and detecting the position of the magnetic head in a radial direction of the magnetic disk by reproducing the self-servo reference signal, thus determining a relationship between the position of the magnetic head and the reproduction signal output of the burst signal; and
(3) determining a data track pitch based on the relationship.

16. The apparatus according to claim 14,
wherein the data track pitch determining means is formed to perform the steps of:
(1) provisionally setting a data track pitch to a predetermined pitch;
(2) recording a predetermined data signal on a plurality of tracks by the magnetic head in accordance with the provisionally set data track pitch, while controlling the positioning of the magnetic head using the self-servo reference signal;
(3) reproducing the data signal by the magnetic head while minutely changing the position of the magnetic head from a position at which the data signal is recorded, and detecting the position of the magnetic head in a radial direction of the magnetic disk by reproducing the self-servo reference signal, thus calculating an offset allowance from a relationship between the position of the magnetic head and the error rate of reproduction of the data signal;

(4) changing the provisionally set data track pitch and then repeating the steps (1) through (3); and (5) determining a relationship between the provisionally set data track pitch and the offset allowance, and determining a data track pitch based on the relationship.

17. The apparatus according to claim 12, wherein the magnetic head is formed by a recording/reproducing separate type magnetic head comprising a recording head and a reproducing head which are separate from each other, wherein the data track pitch determining means is formed to further calculate, from the relationship between the position of the magnetic head and the reproduction signal output of the burst signal, an offset amount between respective gap centers of the recording head and the reproducing head, and wherein the apparatus further comprises a memory for storing the offset amount.

18. The apparatus according to claim 17, wherein a plurality of zones defined by radially dividing the magnetic disk are set in advance for one or more recording surfaces of the magnetic disk, and wherein the offset amount for each of the zones is stored in the memory.

19. The apparatus according to claim 12, wherein a plurality of zones defined by radially dividing the magnetic disk are set in advance for one or more recording surfaces of the magnetic disk, and wherein the data track pitch determining means determines a data track pitch for each of the zones.

20. The method according to claim 2, wherein a plurality of zones defined by radially dividing the magnetic disk are set in advance for one or more recording surfaces of the magnetic disk, and the data track pitch is determined for each of the zones.

21. The apparatus according to claim 13, wherein a plurality of zones defined by radially dividing the magnetic disk are set in advance for one or more recording surfaces of the magnetic disk, and wherein the data track pitch determining means determines a data track pitch for each the zones.

22. The apparatus according to claim 14, wherein a plurality of zones defined by radially dividing the magnetic disk are set in advance for one or more recording surfaces of the magnetic disk, and wherein the data track pitch determining means determines a data track pitch for each the zones.

* * * * *